Feb. 5, 1924.
L. G. STECKER
1,482,872
STORAGE BATTERY
Filed Oct. 11, 1922
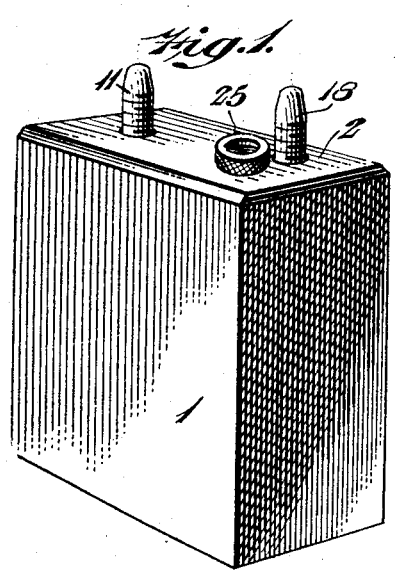
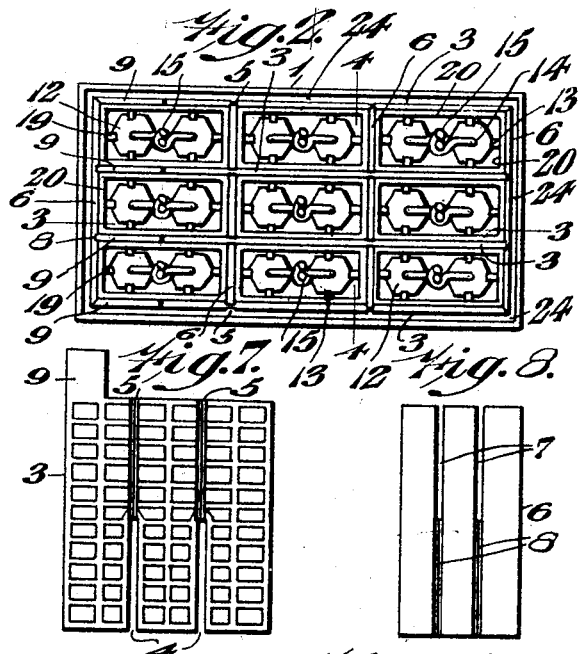
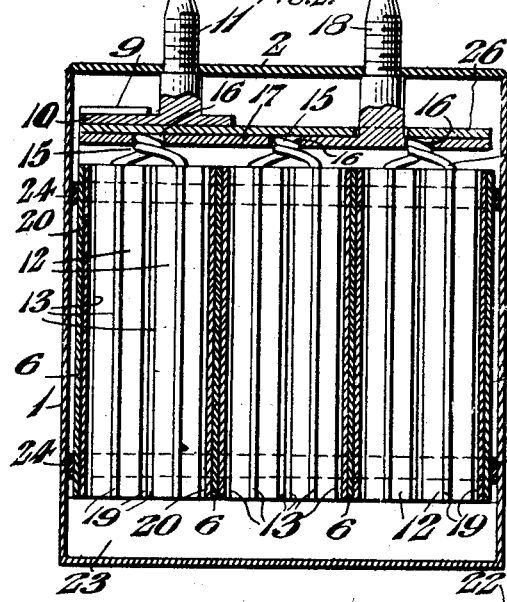
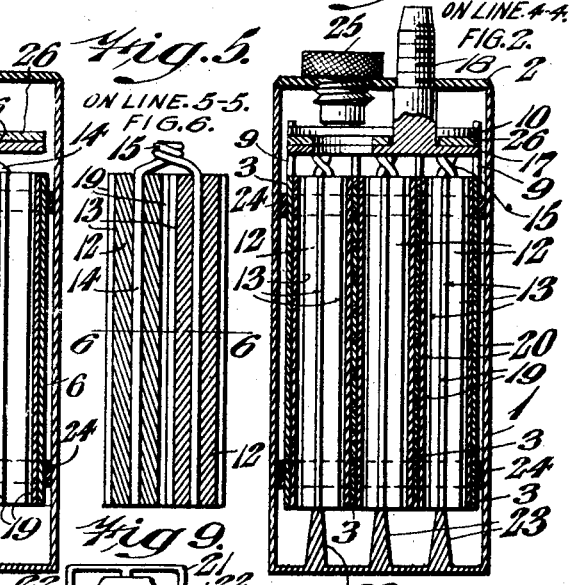
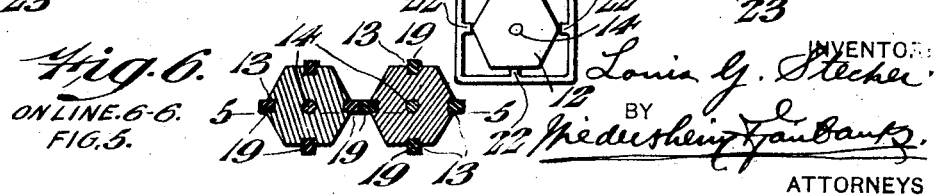
INVENTOR
Louis G. Stecker
BY
ATTORNEYS Patented Feb. 5, 1924.

1,482,872

UNITED STATES PATENT OFFICE.

LOUIS G. STECKER, OF PHILADELPHIA, PENNSYLVANIA.

STORAGE BATTERY.

Application filed October 11, 1922. Serial No. 593,735.

*To all whom it may concern:*

Be it known that I, LOUIS G. STECKER, a citizen of the United States, residing at Philadelphia, county of Philadelphia, State of Pennsylvania, have invented a new and useful Storage Battery, of which the following is a specification.

My invention comprehends a novel construction and arrangement of a storage battery in which the positive and negative plates and separators are constructed and arranged in a novel manner.

It further comprehends a novel construction of negative plates, a novel construction of a positive plate, and a novel construction of separators.

It further comprehends a novel construction of a storage battery wherein the positive plates have a round or polygonally shaped contour with conductors passing through them and wherein one or more positive plates are completely surrounded on all sides by negative plates.

Other novel features of construction and advantage will hereinafter more fully appear in the detailed description.

For the purpose of illustrating my invention, I have shown in the accompanying drawing a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in perspective, a storage battery embodying my invention.

Figure 2 represents a top plan view of the battery with the cover and certain parts removed.

Figure 3 represents a section on line 3—3 of Figure 2.

Figure 4 represents a section on line 4—4 of Figure 2.

Figure 5 represents a section on line 5—5 of Figure 6.

Figure 6 represents a section on line 6—6 of Figure 5.

Figure 7 represents, in side elevation, one of the negative plates.

Figure 8 represents, in side elevation another type of negative plates employed.

Figure 9 represents a top plan view of another embodiment of my invention.

Similar numerals of reference indicate corresponding parts.

Referring to the drawings.

1 designates the casing of a storage battery, embodying my invention, which is of the usual construction and provided with a removable cover 2. 3 designates one set of negative plates which are provided with a desired number of vertically disposed slots 4 and above the slots the grid of the negative battery plate 3 is provided with the grooves 5. 6 designates the other negative plates the immediate ones of which are provided with the vertically disposed slots 7 at its upper end from which extend the grooves 8 formed in the side walls of the grid which forms the battery plate. The end negative plates 6 are of such dimensions that they meet the outermost plates 3, as shown in Figure 2, and in practice such plates are preferably burnt together. The negative plates 3 are provided with the lugs 9 which are connected in any desired manner with the terminal straps 10 to which is connected the terminal 11. 12 designates the positive plates which are in the form of rods which may be round or any other shape, if desired, but are preferably of a polygonal contour in cross section, in order to provide a greater exposed surface. The positive plate 12 is provided with the longitudinally extending grooves 13 on opposite sides, and a conducting rod 14 passes through each positive plate, and the conductor rods of a pair, if employed, are connected together to form a lug 15, which, engages the wall of an aperture 16 in the strap 17, to which is connected the terminal 18. The recesses or slots 13 receive the separator members 19, and, if the positive plates are arranged in pairs, they are surrounded by the separator 20. If desired, the separator 20, which is preferably made of hard rubber, may form an integral part with the members 19, which are preferably made of hard rubber. For example, in Figure 9, the separator 21 is shown as surrounding a single positive plate and is provided with the separator members 22 integral therewith which bear against the positive plate 12. The battery plates rest on the ribs 23, and are surrounded by the shock absorbers 24, which are preferably in the form of rubber bands keep the plates from vibrating and take up the expansion. The cover in the usual manner is provided with a filling opening, which is closed by means of the plug 25. 26 designates a top separator plate.

In accordance with my present invention, I can employ a thick battery plate with as much active material as a thin battery plate. The intermediate negative plates which extend transversely across the battery can be dispensed with, if desired. Special attention is directed to the fact that, in my present invention, the negative plates completely surround the positive plates to form compartments in which any desired number of positive plates may be inserted. I have illustrated the positive tubes as being hexagonal in cross section, but it will be apparent that the positive plates can have any desired contour as long as they have the necessary relation with respect to the negative plates, and sufficient space for the acid or electrolyte is provided. The negative plates are burnt together where they cross each other in order that the current will be conducted from one plate to another.

In so far as I am aware, I am the first in this art to construct a battery with the negative plates of the construction shown completely surrounding the positive plates, and it is therefore to be understood that my claims to such features are entitled to a broad and generic interpretation.

It will now be apparent that I have devised a novel and useful construction of a storage battery which embodies the features of advantage enumerated as desirable in the statement of the invention and the above description, and while I have, in the present instance, shown and described an embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In a storage battery, the combination with negative plates having slots opening through their bottoms, of other negative plates having slots opening through their top and end negative plates, whereby said negative plates can be assembled to form polygonally shaped compartments, and positive plates in said compartments.

2. In a storage battery, negative plates united together to form a compartment, the walls of which are closed at the joints and burnt together, positive plates in the form of bars having conductors passing through them and provided with grooves in their sides, said positive plates being located in said compartment, and separators seated in the grooves of said positive plates.

3. In a storage battery, negative plates united together to form a compartment, the walls of which are closed at the joints and burnt together, positive plates in the form of bars having conductors passing through them and provided with grooves in their sides, said positive plates being located in said compartment, and separators seated in the grooves of said positive plates, and surrounding their respective positive plates.

4. In a storage battery, a set of longitudinally extending negative plates, a set of laterally extending negative plates joined to the first set to form a series of compartments, positive plates in the form of bars polygonal in cross section, and separators between the positive and negative plates.

5. In a storage battery, flat negative plates arranged to form rectangular compartments and positive plates within said compartments and completely surrounded by the walls thereof.

6. In a storage battery, positive plates, comprising longitudinally extending rods of material each having a conductor extending longitudinally therethrough, and negative plates spaced from the positive plates and having their walls imperforate.

7. In a storage battery, a set of positive plates having imperforate walls and a set of negative plates, one of said sets completely surrounding the other to form a closed compartment which is open at opposite ends, in combination with a battery casing adapted to receive the electrolyte and in which said sets of plates are adapted to be received.

8. In a storage battery, flat negative plates arranged in sets disposed at right angles to each other to form compartments, and positive plates in said compartments, polygonal in cross section, and having conductors passing through them.

LOUIS G. STECKER.

Witnesses:
H. S. FAIRBANKS,
C. D. McVAY.